United States Patent [19]

Jewell et al.

[11] 4,388,259

[45] Jun. 14, 1983

[54] FLUOROCARBON POLYMER GASKET AND METHOD OF MANUFACTURING SUCH

[75] Inventors: Walter E. B. Jewell, Glenside; Adam J. Patarcity, Levittown, both of Pa.

[73] Assignee: Kennecott Corporation, Stamford, Conn.

[21] Appl. No.: 314,186

[22] Filed: Oct. 23, 1981

[51] Int. Cl.³ .............................................. B29C 3/00
[52] U.S. Cl. .................................... 264/153; 264/322; 277/213; 277/215; 277/209; 277/DIG. 6
[58] Field of Search .............................. 264/127, 322; 425/DIG. 55; 277/204, 209, 210, 213, 215, DIG. 6

[56] References Cited

U.S. PATENT DOCUMENTS 3,151,869 10/1964 Butcher ............................... 277/209
3,531,133 9/1970 Sheesley .......................... 277/209 X
4,052,502 10/1977 Clark .............................. 264/322 X Primary Examiner—Thomas P. Pavelko
Attorney, Agent, or Firm—R. Lawrence Sahr; Harold M. Snyder; William T. King

[57] ABSTRACT

A fluorocarbon polymer gasket is disclosed which has been compression formed from a fluorocarbon polymer sheet heated to its gel state, cooled in its compressed state, and shaped into a gasket. The gasket so manufactured has a "living memory" thus enabling it to tend to return to its pre-compression form when exposed to elevated temperatures.

14 Claims, 3 Drawing Figures

FLUOROCARBON POLYMER GASKET AND METHOD OF MANUFACTURING SUCH

BACKGROUND OF THE INVENTION

1. Field of the Invention

This invention relates to the field sealing joints, more particularly, to the field of gaskets and methods for manufacturing them.

2. Description of the Prior Art

Various materials, such as cork, leather, rubber, plastic, and asbestos are used for the manufacture of gaskets. Of these materials, asbestos is most widely used for gaskets subject to extreme temperatures. However, asbestos gaskets tend to compress and laterally flatten under high temperature and pressure, resulting in leakage at the fitting which the gasket was intended to seal. To avoid leakage, the bolts of abutting flanges must be retorqued periodically to insure a fluid tight seal with the gasket, a time consuming process, especially where flanges are numerous and awkwardly located. More importantly, microscopic asbestos fibers which are inhaled are known to cause lung cancer. Thus, elimination of asbestos from the work environment is most desirable.

A superior replacement for asbestos gaskets are gaskets made from fluorocarbon polymers, for example, tetrafluoroethylene (TFE). However, by virtue of the present invention, the properties of fluorocarbon polymer gaskets are greatly enhanced when manufactured by hot coining. One of the advantages imparted to hot coined fluorocarbon polymer gaskets is their "living memory", a term which describes the gasket's expansion at elevated temperatures and the subsequent return to coined dimensions when cooled. At lowered temperatures, hot coined fluorocarbon polymer gaskets substantially retain their coined dimensions and flexibility. Further, creep or cold flow, defined as the total deformation of the gasket under stress after a period of time in a given environment beyond that initial strain that occurs immediately upon loading, is virtually eliminated. Thus, the need for retorquing flange bolts, loosened by gasket elongation or flattening between the flange faces in response to extremes in temperature and pressure, is eliminated by using hot coined fluorocarbon polymer gaskets having a "living memory".

Another advantage of hot coined fluorocarbon polymer gaskets is their ease of repair and reusability. A damaged fluorocarbon polymer gasket can be simply heated to its fluorocarbon polymer gel temperature after which it is hot coined anew. Also, since fluorocarbon gaskets experience no brittleness or deformation as a result of successive compression and recovery, they may be used repeatedly.

Additionally, fluorocarbon polymer gaskets are ideally suited for chemical applications since fluorocarbon polymers are corrosion resistant, nonsoluble, nonadhesive and nonflammable.

Finally, the carcinogenic asbestos health hazard is eliminated by substituting asbestos gaskets with fluorocarbon polymer gaskets.

SUMMARY OF THE INVENTION

The present invention includes fluorocarbon polymer gaskets, which are blank-formed from a pre-determined thickness of a fluorocarbon polymer sheet, depending on the thickness of gasket desired. The fluorocarbon polymer sheet is heated to a pre-determined elevated temperature, depending on the particular species of fluorocarbon polymer which is being used, then hot coined to a thickness which is less than that of the sheet used to blank-form the gasket. The hot coining operation can also impart a particular surface configuration or cross sectional shape to the gasket as desired. The hot coining operation serves to hold the formed gasket in its molecularly deformed configuration while it is being cooled below the fluorocarbon polymer gel temperature. After cooling, the coining press and dies are opened, the sheet removed, and the finished gasket punched from the sheet. The resulting hot coined gasket has a "living memory", seeking to expand to the thickness of the fluorocarbon polymer sheet from which it was hot coined when exposed to elevated temperatures below the fluorocarbon polymer gel temperature, yet returning to its coined dimensions upon being cooled. Coined dimensions and flexibility are virtually retained at low temperatures. Such characteristics are especially useful in gaskets which seal fittings subject to variable temperatures.

DETAILED DESCRIPTION

Figure 1:
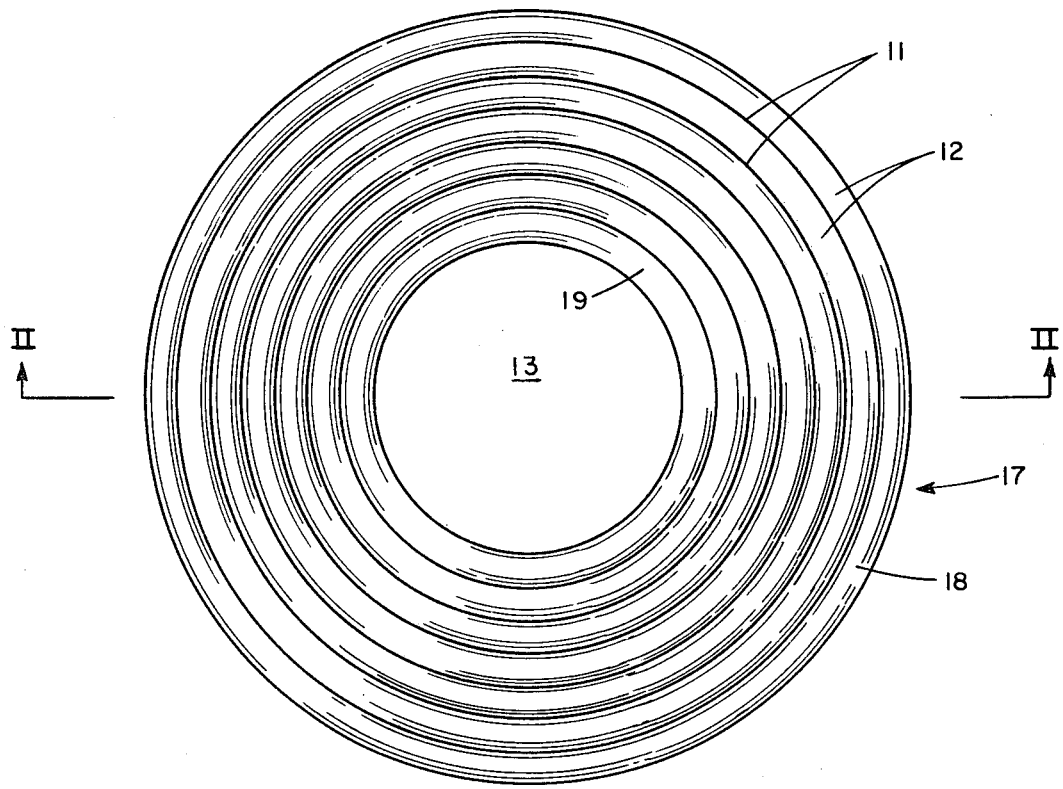
FIG. 1 is a side view of the gasket showing the concentric arrangement of the ribs.

According to the present invention, a method is provided for the manufacture of fluorocarbon polymer gaskets which expand when heated to temperatures above ambient and return to preheated dimensions when cooled. Additionally, the gaskets of the present invention retain their ambient temperature dimensions when cooled substantially below ambient temperature.

Fluorocarbon polymer gaskets having the above described characteristics may be produced by first selecting a sheet of fluorocarbon polymer. Tetrafluoroethylene polymers have been found to be most suitable for the hot coin manufacture of gaskets having the properties described. In general, the thickness of the fluorocarbon polymer sheet to be selected is necessarily greater than the thickness of the gasket to be coined for a particular application. For example, a sheet of about 5/16 inch thickness may be hot coined to form a gasket having approximately a 5/32 inch thickness. This 5/32 inch gasket may then be used in any application where a conventional gasket of equal thickness is specified.

Once the fluorocarbon polymer sheet of desired thickness has been selected, it is preferably heated to within a temperature range at which the fluorocarbon polymer enters a gel state. Tetrafluoroethylene, for example, enters the gel state when heated within the approximate temperature range of 650° F. to 740° F., although it may begin to degrade at higher temperatures. Heating of the fluorocarbon polymer sheet is accomplished in the preferred embodiment using platten heaters. A platten heater consists essentially of a vertically adjustable surface on which the sheet to be heated is placed. The adjustable surface is then raised to bring the supported sheet in contact pressure with a fixed, heat regulated surface. In the preferred embodiment, electric heater elements bring the fixed surface within the gel temperature range which in turn heats the abutting fluorocarbon polymer sheet, although other sources of heat may also be used. The fluorocarbon polymer sheet generally enters the gel state after a few minutes in the platten heater. For example, a 5/16 inch tetrafluoroethylene sheet gels within approximately five minutes in a platten heater which generates a temperature in the range of approximately 640° F. to 700° F.

Once gelled, the fluorocarbon polymer sheet is preferably positioned between opposing dies of a coining press. The coining press of the preferred embodiment consists of oppositely positioned dies mounted for vertical movement on a hydraulic press. The hydraulic press functions to bring the oppositely positioned dies together to exert pressure on the gelled fluorocarbon polymer sheet. It is preferred that a 500 ton capacity coining press apply pressure to the dies for approximately one to one and one-half minutes in order to coin the gelled fluorocarbon polymer sheet into the desired gasket. During coining in the preferred embodiment, the dies are maintained at room temperature by circulating water through them although the die temperature may be regulated by other means. In some instances, it may be desirable to maintain the dies at temperatures other than ambient.

During the coining process in the preferred embodiment, the fluorocarbon polymer sheet is cooled under pressure of the dies to below its gel temperature, preferably somewhat below 500° F., thereby becoming molecularly stable. By maintaining pressure on the fluorocarbon polymer sheet while it cools, the dimensions and particular shape distortion, i.e. the coin imparted to the sheet by heat and pressure, is "set" or maintained, after which the sheet may be removed from the coining press. Once the coined sheet has preferably cooled to near ambient temperature, that coined portion of the fluorocarbon sheet may be removed from the coining press and then sized by suitable means into the desired size gasket. Steel ruled sizing dies have been found to be adequate for this purpose.

Figure 2:
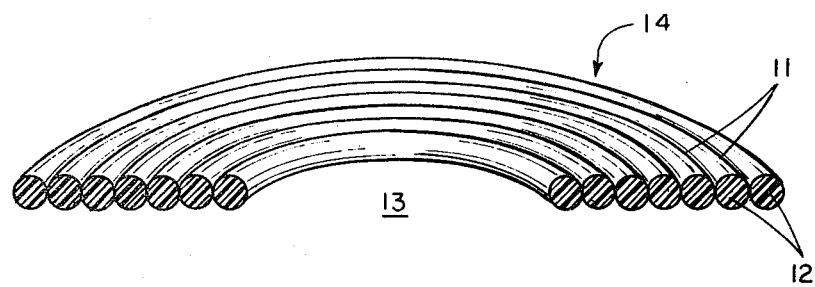
FIG. 2 is a cross-sectional end view of the gasket along line 2—2.
Figure 3:
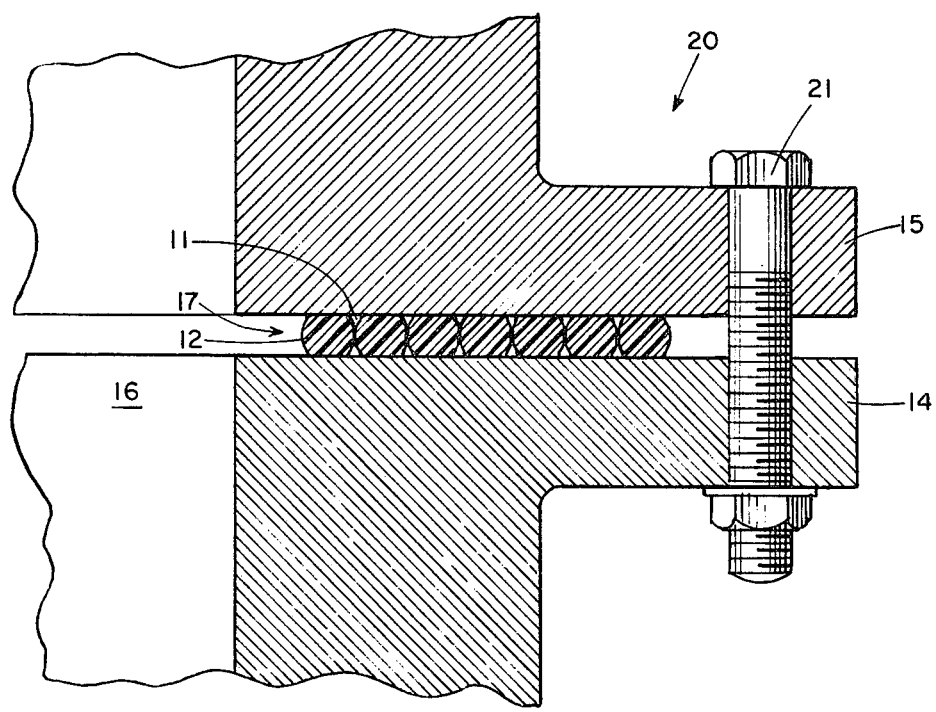
FIG. 3 is a cross sectional end view of the gasket in an expanded condition between bolted pipe flanges.

In the preferred embodiment of the gasket, a particular surface configuration is imparted to the hot coined portion of the fluorocarbon polymer sheet. A most advantageous configuration is that of concentric circular grooves 11 which form a gasket 17 comprised essentially of what appears to be a series of spaced, circularly parallel projections in the form of ribs 12 as best shown in FIGS. 1 and 2. Each rib 12 is circular with a round cross-section. The ribs are arranged in order of increasing circumference, the rib having the least circumference 19 defining the central gasket aperture 13. The outermost rib 18 having the greatest circumference defines the gasket's outer perimeter. Each rib 12 functions, in effect, as an expandable "O" ring. It has been found that gaskets having the "O" ring configuration preferably need at least three abutting ribs to be maximally effective. When the gasket 17 is placed within, for example, a pipe fitting 20, having an axial conduit 16, as shown in FIG. 3, it laterally compresses somewhat due to the initial torquing of the flange bolts 21, functioning effectively as a conventional gasket. Upon heating, however, the gasket ribs expand, seeking to return to the thickness of the fluorocarbon polymer sheet from which the gasket was hot coined. As each rib 12 of the gasket 17 expands, it presses against adjacent ribs and the confines of the abutting flange faces 14 and 15, taking on a cross-sectional shape somewhat akin to a square with rounded edges, thereby sealing the fitting 20 with greater integrity than was heretofore possible using conventional gaskets. Upon cooling, the gasket exhibits its "living memory" by returning to its preheated, coined dimensions, again serving as a conventional gasket, without the need to retorque flange bolts. When the gasket 17 is cooled to temperatures below ambient, it retains coined dimensions and elastic qualities present at ambient temperatures. For tetrafluoroethylene polymer gaskets, one can expect continuous service from within a temperature range of approximately −320° F. to +500° F.

Fluorocarbon polymer gaskets are further characterized by their repair potential. Gaskets which have been damaged, for example, by overheating within a pipe flange, can be easily returned to original specifications by heating the gasket to within the fluorocarbon polymer gel temperature range, which restores the gasket to a flat disc having the thickness of the sheet from which it was originally hot coined. This re-expanded gasket disc may then be coined anew by simply repeating the coining process already discussed.

Still further, fluorocarbon polymer gaskets of the present invention may be returned to service following dismantling of a pipe fitting. The economic benefit of such a reusable gasket is obvious.

While the invention has been described in connection with specific embodiments thereof, it will be understood that it is capable of further modification, and this application is intended to cover any variations, uses, or adaptations of the invention. It will, therefore, be recognized that the invention is not to be considered as limited to the precise embodiments shown and described but is to be interpreted as broadly as permitted by the appended claims.

What is claimed is:

1. A method of manufacturing fluorocarbon polymer gaskets which comprises:
    (a) heating a fluorocarbon polymer sheet of predetermined thickness to within the temperature range at which the fluoro-carbon polymer enters the gel state;
    (b) compressing said heated sheet to a thickness less than said sheet's predetermined thickness;
    (c) cooling said sheet in its compressed state; and
    (d) cutting said sheet, cooled in its compressed state, into a gasket.

2. The invention as recited in claim 1, wherein the heated fluorocarbon polymer sheet is compressed for approximately one to one and one-half minutes.

3. The invention as recited in claim 1, wherein said heated and compressed fluorocarbon polymer sheet is cooled to ambient temperature.

4. The invention as recited in claim 1, wherein said fluorocarbon polymer is tetrafluoroethylene.

5. The invention as recited in claim 1, wherein said heated fluorocarbon polymer sheet is compressed between opposing dies of a coining press.

6. The invention as recited in claim 5, wherein pressure is exerted on said heated fluorocarbon polymer sheet by opposing dies of at least about a 500 ton capacity coining press.

7. A method of manufacturing fluorocarbon polymer gaskets which comprises:
    (a) heating a fluorocarbon polymer sheet of predetermined thickness to within the temperature range at which the fluorocarbon polymer of said sheet enters the gel state;

(b) hot coining said heated fluorocarbon polymer sheet, which has entered the gel state, between opposing dies of a coining press;

(c) cooling said coined fluorocarbon polymer sheet, while holding said coined fluorocarbon polymer sheet under compression between coining press dies, to a temperature below the temperature at which said fluorocarbon polymer enters the gel state;

(d) releasing said coining press dies from compressing said cooled and coined fluorocarbon polymer sheet;

(e) removing said cooled and coined fluorocarbon polymer sheet from between the dies of the coining press; and (f) cutting said removed cool fluorocarbon polymer sheet into a gasket.

8. The invention as recited in claim 7, wherein the heated, fluorocarbon polymer sheet is coined between opposing dies of a coining press of at least 500 ton capacity.

9. The invention as recited in claim 7, wherein the heated fluorocarbon polymer sheet is hot coined between the coining press dies for approximately one to one and one-half minutes prior to said cooling.

10. The invention as recited in claim 7, wherein said hot coined and cooled fluorocarbon polymer sheet is shaped into a gasket of the desired size by cutting means.

11. The invention recited in claim 10 wherein said cutting means includes steel rule sizing die means.

12. The invention as recited in claim 7, wherein the opposing dies of the coining press include regulatable cooling means.

13. The invention as recited in claim 12, wherein the opposing dies of the coining press are regulated to cool said hot coined fluorocarbon polymer sheet to ambient temperature.

14. The invention as recited in claim 13, wherein said regulatable cooling means includes means to circulate water through said dies.

* * * * *